United States Patent
Han

(10) Patent No.: US 12,100,827 B2
(45) Date of Patent: Sep. 24, 2024

(54) APPARATUS FOR MANUFACTURING ELECTRODE FOR SECONDARY BATTERY, ELECTRODE FOR SECONDARY BATTERY MANUFACTURED THERETHROUGH, AND SECONDARY BATTERY

(71) Applicant: LG ENERGY SOLUTION, LTD., Seoul (KR)

(72) Inventor: Hyun Gyu Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 157 days.

(21) Appl. No.: 17/598,729

(22) PCT Filed: Mar. 25, 2020

(86) PCT No.: PCT/KR2020/004070
§ 371 (c)(1),
(2) Date: Sep. 27, 2021

(87) PCT Pub. No.: WO2020/197266
PCT Pub. Date: Oct. 1, 2020

(65) Prior Publication Data
US 2022/0158162 A1    May 19, 2022

(30) Foreign Application Priority Data

Mar. 28, 2019  (KR) .................. 10-2019-0036136

(51) Int. Cl.
*H01M 4/04* (2006.01)
*B26F 1/12* (2006.01)
(Continued)

(52) U.S. Cl.
CPC ............. *H01M 4/0435* (2013.01); *B26F 1/12* (2013.01); *B26F 1/44* (2013.01); *H01M 50/533* (2021.01); *H01M 50/102* (2021.01)

(58) Field of Classification Search
CPC ... B26F 1/12; B26F 1/44; B26D 1/245; B26D 9/00; B26D 1/1435; H01M 4/0435; H01M 50/533; H01M 50/102
See application file for complete search history.

(56) References Cited

U.S. PATENT DOCUMENTS 6,605,388 B1 * 8/2003 Goda ................... H01M 4/742
                                                   429/243
9,579,924 B2    2/2017 Boegli
(Continued)

FOREIGN PATENT DOCUMENTS

CN    102017237 A    4/2011
CN    108028359 A    5/2018
(Continued)

OTHER PUBLICATIONS

Machine translation of Haga et al. (JP 2001093515 A), corresponding to foreign patent document provided with Jun. 10, 2022 IDS (Year: 2001).*
(Continued)

*Primary Examiner* — Matthew T Martin
*Assistant Examiner* — Jessie Walls-Murray
(74) *Attorney, Agent, or Firm* — Birch, Stewart, Kolasch & Birch, LLP

(57) ABSTRACT

Discussed is an apparatus for manufacturing an electrode for a secondary battery, an electrode for a secondary battery which is manufactured therethrough, and a secondary battery. The apparatus notches a portion of a non-coating portion of an electrode collector, which is not coated with an electrode active material, in an electrode sheet coated with the electrode active material on the electrode collector to manufacture an electrode tab. The apparatus includes a notching roll that rotates to notch the portion of the non-coating portion, wherein the notching roll includes: a notching cutter provided on a portion of the notching roll, which (Continued)

faces the non-coating portion to notch the electrode sheet; and a roll pad provided on a portion of the notching roll, which faces the electrode active material, the roll pad contacting the electrode sheet when the notching roll rotates to prevent the electrode sheet from being slipped.

19 Claims, 15 Drawing Sheets

(51) Int. Cl.
*B26F 1/44* (2006.01)
*H01M 50/533* (2021.01)
*H01M 50/102* (2021.01)

(56) References Cited

U.S. PATENT DOCUMENTS

| | | |
|---|---|---|
| 2002/0104412 A1 | 8/2002 | Marlow et al. |
| 2003/0029333 A1* | 2/2003 | Sato ................ H01M 4/04 100/155 R |
| 2003/0143466 A1* | 7/2003 | Goda ............... H01M 4/70 29/2 |
| 2004/0079465 A1 | 4/2004 | Marlow et al. |
| 2011/0091754 A1 | 4/2011 | Miyahisa et al. |
| 2012/0045689 A1* | 2/2012 | Okabe ............. H01M 4/0435 427/58 |
| 2015/0059599 A1 | 3/2015 | Boegli |
| 2018/0337392 A1 | 11/2018 | Lee et al. |
| 2020/0295378 A1* | 9/2020 | Lai .................. H01G 11/68 |

FOREIGN PATENT DOCUMENTS

| | | |
|---|---|---|
| JP | 2001-93515 A | 4/2001 |
| JP | 2001-266857 A | 9/2001 |
| JP | 3707341 B2 | 10/2005 |
| JP | 2011-81964 A | 4/2011 |
| JP | 2018-73658 A | 5/2018 |
| KR | 20-0302488 Y1 | 1/2003 |
| KR | 10-2004-0020881 A | 3/2004 |
| KR | 10-2014-0015647 A | 2/2014 |
| KR | 10-2015-0037212 A | 4/2015 |
| KR | 10-2016-0115419 A | 10/2016 |
| KR | 10-2016-0141448 A | 12/2016 |
| KR | 10-2017-0048757 A | 5/2017 |
| KR | 10-2017-0055722 A | 5/2017 |
| KR | 10-2018-0004588 A | 1/2018 |
| KR | 10-1926451 B1 | 12/2018 |
| WO | WO-2013168563 A1 * | 11/2013 ........ H01M 10/0404 |

OTHER PUBLICATIONS

Machine Translation of: Hiroaki et al., JP 3707341 B2, corresponding to the foreign patent cited and provided in the Sep. 27, 2021 IDS (Year: 2005).*

Extended European Search Report for European Application No. 20778385.3, dated Apr. 4, 2022.

International Search Report for PCT/KR2020/004070 mailed on Jul. 8, 2020.

* cited by examiner

B-B'

APPARATUS FOR MANUFACTURING ELECTRODE FOR SECONDARY BATTERY, ELECTRODE FOR SECONDARY BATTERY MANUFACTURED THERETHROUGH, AND SECONDARY BATTERY

CROSS-REFERENCE TO RELATED APPLICATION

The present application claims the benefit of the priority of Korean Patent Application No. 10-2019-0036136, filed on Mar. 28, 2019, which is hereby incorporated by reference in its entirety.

TECHNICAL FIELD

The present invention relates to an apparatus for manufacturing an electrode for a secondary battery, the electrode for a secondary battery, which is manufactured therethrough, and a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

Also, the electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

In the apparatus for manufacturing the electrode according to the related art, a notching device is a device for forming an electrode tab by punching the electrode. Here, in a notching process, the electrode is produced in a manner in which a desired notch mold is manufactured to match a size of the electrode, and then, the notching mold vertically moves upward and downward in the notching device to punch the electrode one by one. In this case, the left and right electrodes may be twisted in length in a direction of the tab due to twisting in a traveling direction of the notching mold, and there is a difficulty in continuous processing of the mold because the mold is reduced in lifespan due to the punching manner. In addition, there is a limitation in noise and speed in the process. When tensile strength of the electrode does not sustain tension of the electrode generated during the punching, the electrode may be broken.

[Prior Art Document] (Patent Document) Korean Patent Publication No. 10-2014-0015647

DISCLOSURE OF THE INVENTION

Technical Problem

One aspect of the present invention is to provide an apparatus for manufacturing an electrode for a secondary battery, which is capable of preventing the electrode from being damaged while the electrode is notched to form an electrode tab on the electrode, the electrode for a secondary battery, which is manufactured therethrough, and a secondary battery.

Another aspect of the present invention is to provide an apparatus for manufacturing an electrode for a secondary battery, in which notching for forming an electrode tab on the electrode increases in speed, the electrode for a secondary battery, which is manufactured therethrough, and a secondary battery.

Technical Solution

An apparatus for manufacturing an electrode for a secondary battery, which notches a portion of a non-coating portion of an electrode collector, which is not coated with an electrode active material, in an electrode sheet coated with the electrode active material on the electrode collector to form an electrode tab, according to an embodiment of the present invention may comprise: a notching roll that rotates to notch the portion of the non-coating portion of the electrode sheet to form the electrode tab, wherein the notching roll comprises: a notching cutter provided on a portion of the notching roll, which faces the non-coating portion of the electrode collector, to notch the electrode sheet; and a roll pad provided on a portion of the notching roll, which faces the electrode active material, the roll pad contacting the electrode sheet when the notching roll rotates to prevent the electrode sheet from being slipped.

In addition, an electrode for a secondary battery according to an embodiment of the present invention may be manufactured through the apparatus for manufacturing the electrode for the secondary battery according to an embodiment of the present invention.

In addition, a secondary battery according to an embodiment of the present invention may be manufactured through the apparatus for manufacturing the electrode for the secondary battery according to an embodiment of the present invention.

Advantageous Effects

According to the present invention, when the electrode is notched, since the notching roll rotates to form the electrode tab, the stress may not be applied to the tension of the electrode to prevent the damage such as the short circuit from occurring.

In addition, according to the present invention, since the notching roll rotates to notch the electrode so as to form the electrode tab, the notching speed may be adjusted, and also, the notching speed may increase.

In addition, according to the present invention, since the notching roll rotates to notch the electrode, the rotation axis of the notching roll is constant, the width of the electrode in the tab direction may be constant, the mold may increase in lifespan, and the noise may be reduced.

MODE FOR CARRYING OUT THE INVENTION

Figure 1:
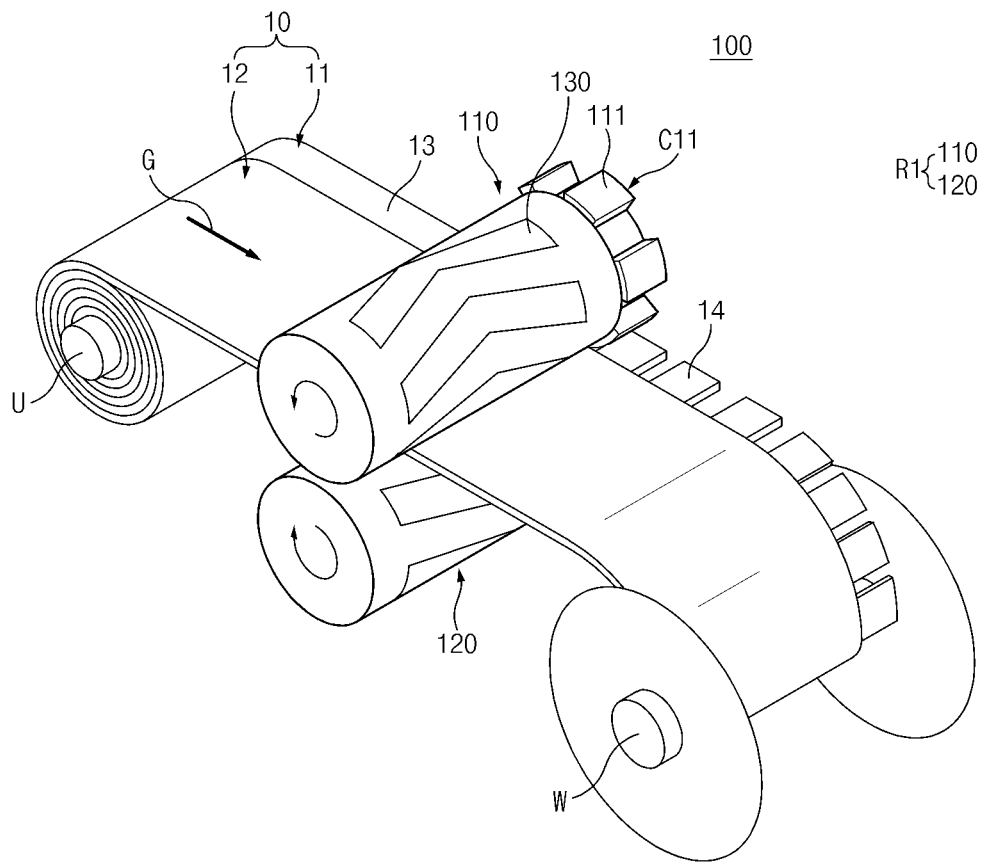
FIG. 1 is a conceptual perspective view of an apparatus for manufacturing an electrode for a secondary battery according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
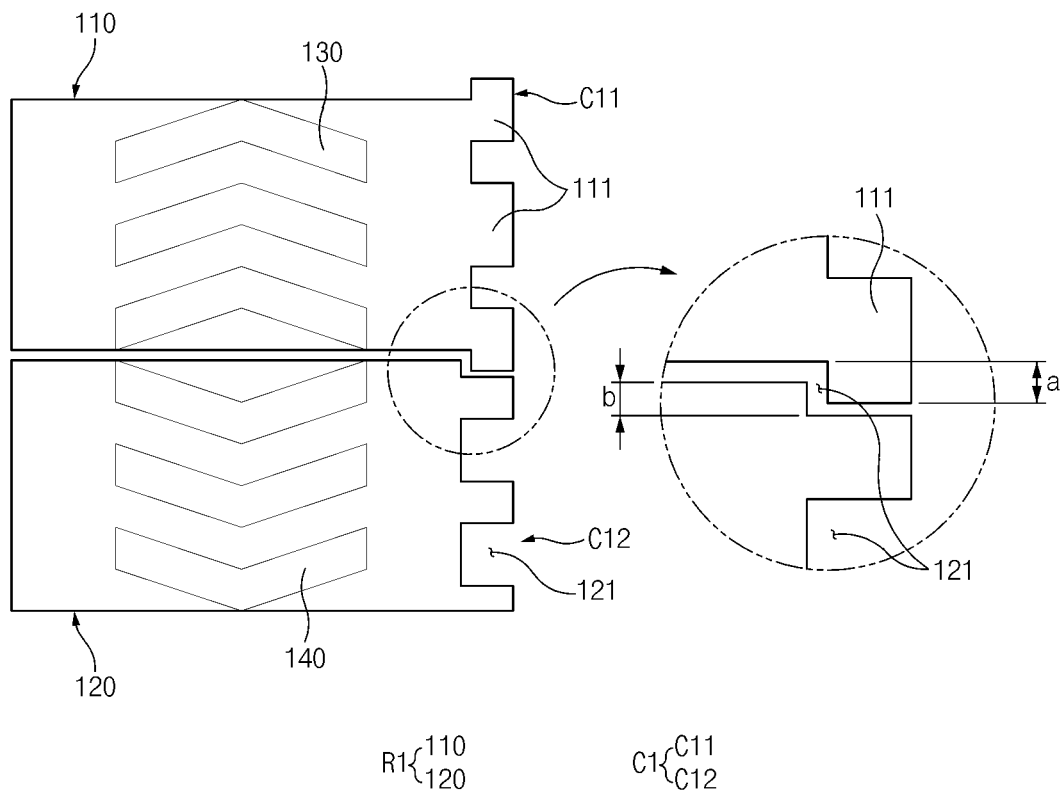
FIG. 2 is a front view of a notching roll in the apparatus for manufacturing the electrode for the secondary battery according to an embodiment of the present invention.

FIG. 1 is a conceptual perspective view of an apparatus for manufacturing an electrode for a secondary battery according to an embodiment of the present invention, and FIG. 2 is a front view of a notching roll in the apparatus for manufacturing the electrode for the secondary battery according to an embodiment of the present invention.

Referring to FIGS. 1 and 2, an apparatus 100 for manufacturing an electrode for a secondary battery comprises a notching roll R1 that rotates to notch an electrode sheet 10 so as to form an electrode tab 14. The notching roll R1 comprises a notching cutter C1 that notches the electrode sheet 10 and roll pads 130 and 140 contacting the electrode sheet 10 to prevent the electrode sheet 10 from being slipped. Also, referring to FIG. 6, in the apparatus 100 for manufacturing the electrode for the secondary battery according to an embodiment of the present invention, the notching roll R1 may further comprise a pattern formation part P forming an uneven pattern on the electrode tab 14. Furthermore, the apparatus 100 for manufacturing the electrode for the secondary battery according to an embodiment of the present invention may further comprise a supply roll U supplying the electrode sheet 10 and a winding roll W around which the notched electrode sheet 10 is wound.

In more detail, the apparatus 100 for manufacturing the electrode for the secondary battery according to an embodiment of the present invention is an apparatus for manufacturing an electrode, which notches a portion of a non-coating portion of an electrode collector 11, which is not coated with an electrode active material 12, in the electrode sheet 10 coated with the electrode active material 12 on the electrode collector 11 to form the electrode tab 14.

The electrode sheet 10 manufactured through the apparatus 100 for manufacturing the electrode for the secondary battery according to an embodiment of the present invention may be alternately stacked with a separator so as to be manufactured as an electrode assembly. Here, the electrode assembly may be a power generation element that is chargeable and dischargeable and be accommodated in a battery case and manufactured as a secondary battery. Here, the electrode sheet 10 may be constituted by a positive electrode and a negative electrode.

Figure 3:
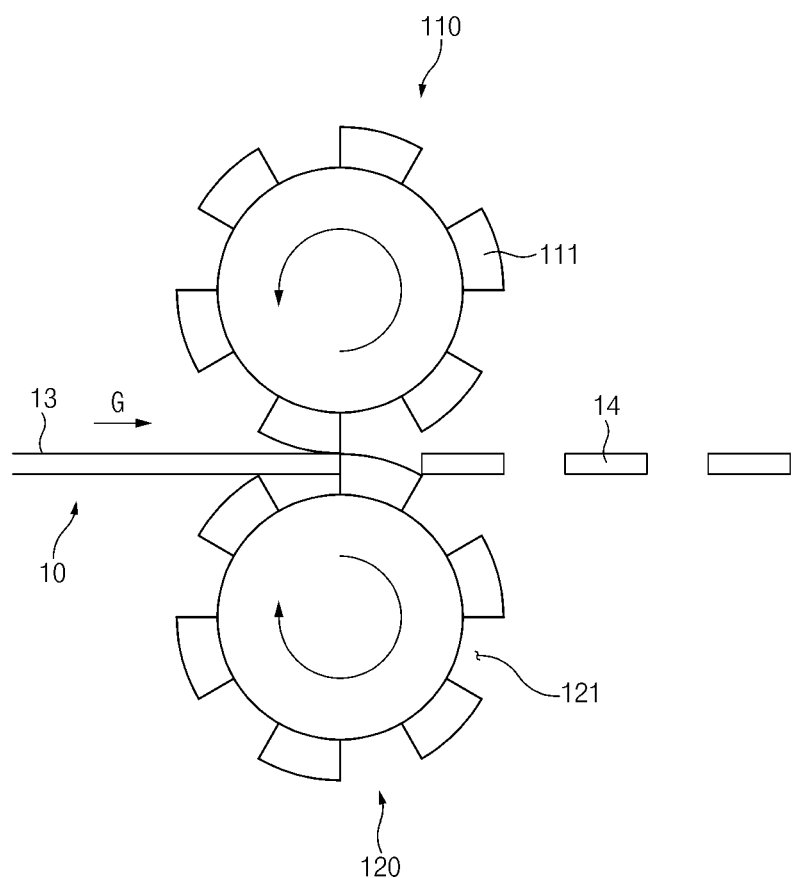
FIG. 3 is a cross-sectional view illustrating a use state of the notching roll in the apparatus for manufacturing the electrode for the secondary battery according to an embodiment of the present invention.
Figure 4:
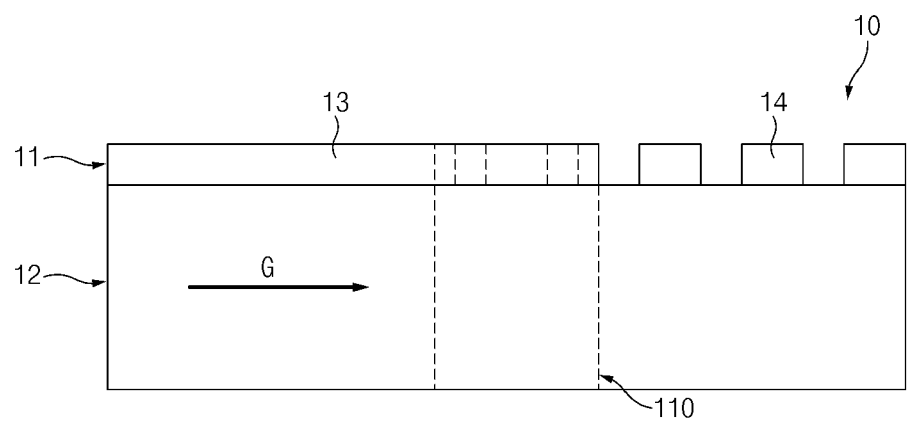
FIG. 4 is a plan view illustrating an example of an electrode sheet that is notched through the apparatus for manufacturing the electrode for the secondary battery according to an embodiment of the present invention.
Figure 5:
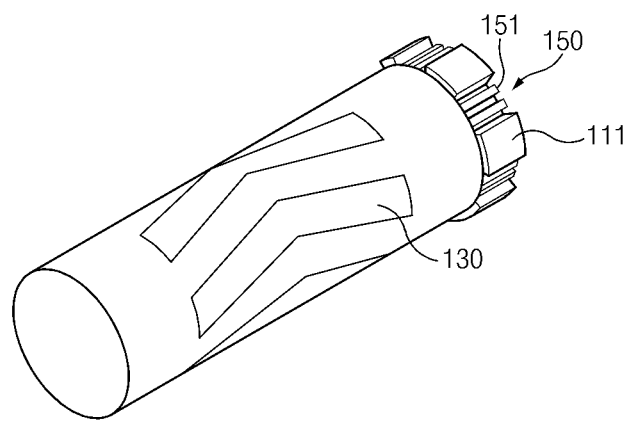
FIG. 5 is a perspective view illustrating an example of a first notching roll in the apparatus for manufacturing the electrode for the secondary battery according to an embodiment of the present invention.

FIG. 3 is a cross-sectional view illustrating a use state of the notching roll in the apparatus for manufacturing the electrode for the secondary battery according to an embodiment of the present invention, FIG. 4 is a plan view illustrating an example of the electrode sheet that is notched through the apparatus for manufacturing the electrode for the secondary battery according to an embodiment of the present invention, and FIG. 5 is a perspective view illustrating an example of a first notching roll in the apparatus for manufacturing the electrode for the secondary battery according to an embodiment of the present invention.

Referring to FIGS. 1 to 5, the notching roll R1 may notch the portion of the non-coating portion 13 of the electrode sheet 10 to form the electrode tab 14. Here, the notching roll R1 may be provided in a pair and may comprise a first notching roll 110 and a second notching roll 120, which face both surfaces of the electrode sheet 10.

The notching roll R1 may comprise a notching cutter C1, roll pads 130 and 140, and a pattern formation part P.

Referring to FIGS. 1 to 3, the notching cutter C1 may be provided on a portion of the notching roll R1, which faces the portion of the non-coating portion 13 of the electrode collector 11, to notch the electrode sheet 10.

Also, the notching cutter C1 may comprise a first notching cutter C11 disposed on the first notching roll 110 and a second notching cutter C12 disposed on the second notching roll 120. Here, the first notching cutter C11 and the second notching cutter C12 may be disposed at mutually corresponding portions on the first notching roll 110 and the second notching roll 120, respectively.

The first notching cutter C11 may provide a protruding convex portion 111, and the second notching cutter C12 may provide a concave portion 121 provided in a groove shape.

Here, the convex portion 111 and the concave portion 121 are provided in shapes corresponding to each other to notch the electrode sheet 10 disposed between the convex portion 111 and the concave portion 121, thereby forming the electrode tab 14.

Also, the convex portion 111 on the first notching cutter C11 may protrude by a predetermined distance a in a direction of the concave portion 121 of the second notching cutter C12 on an outer circumferential surface of the first notching roll 110.

Furthermore, a bottom surface of the concave portion 121 of the second notching cutter C12 may be disposed at a position that is recessed by a predetermined distance b inward on the outer circumferential surface of the second notching roll 120.

Also, in the notching cutter C11, the convex portion 111 may be provided in plurality, which are disposed at regular intervals along the outer circumferential surface of the first notching roll 110. In the second notching cutter C12, the concave portion 121 may be provided in plurality, which are disposed at regular intervals along the outer circumferential surface of the second notching roll 120.

The convex portion 111 of the first notching cutter C11 may be provided in a square pillar shape. Here, the concave portion 121 of the second notching cutter C12 may be provided to correspond to the convex portion 111 having the square pillar shape of the first notching cutter C11.

Referring to FIGS. 1, 2, and 5, the roll pads 130 and 140 may be provided on portions of the notching roll R1, which face the electrode active material 12. When the notching roll R1 rotates, the roll pads 130 and 140 may contact the electrode sheet 10 to prevent the electrode sheet 10 from being slipped and prevent the width of the electrode sheet 10 from being deformed so that the notching is smoothly performed.

The roll pads 130 and 140 may be provided with a plurality of patterns that are disposed at regular intervals along the outer circumferential surface of the notching roll R1.

The patterns may be provided in a shape that a central portion protrudes in a traveling direction G of the electrode sheet 10. Thus, the electrode sheet 10 may be spread from a central portion to both sides to prevent the electrode sheet 10 from being crushed or deformed. Here, the patterns may be provided, for example, in the form of an arrow or a triangle.

Also, the roll pads 130 and 140 may be provided on the outer circumferential surfaces of the first notching roll 110 and the second notching roll 120 in the notching roll R1, respectively. Here, for example, the roll pad 130 provided on the first notching roll 110 and the roll pad 140 provided on the second notching roll 120 may be disposed in shapes corresponding to each other.

Each of the roll pads 130 and 140 may comprise an ethylene vinyl acetate (EVA) foam material. Here, the EVA foam is a material that is excellent in flexibility, strong against an internal impact, and excellent in impact prevention and impact absorption. When applied to the roll pads 130 and 140, the EVA form may prevent the electrode sheet 10 from being slipped and also prevent an outer surface of the electrode sheet 10 from being damaged by the first notching roll 110 and the second notching roll 120.

Figure 6:
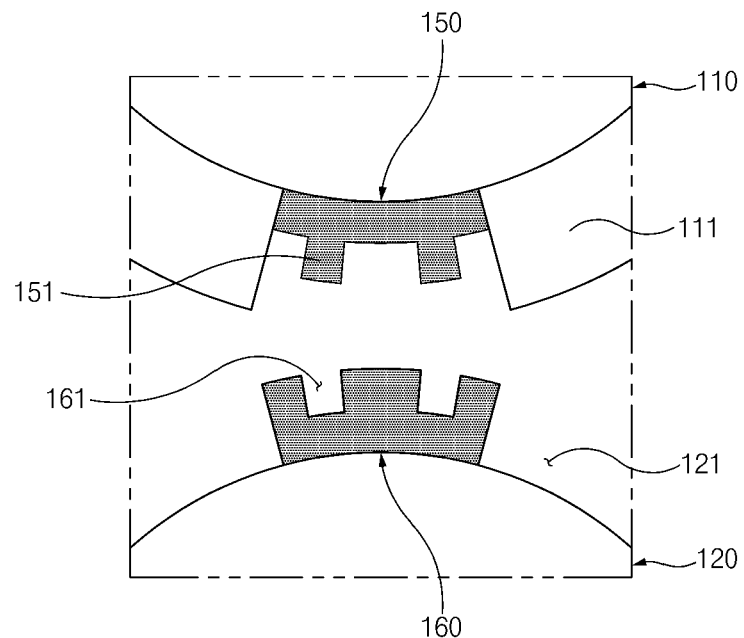
FIG. 6 is a cross-sectional view illustrating an example of a pattern formation part in the apparatus for manufacturing the electrode for the secondary battery according to an embodiment of the present invention.
Figure 7:
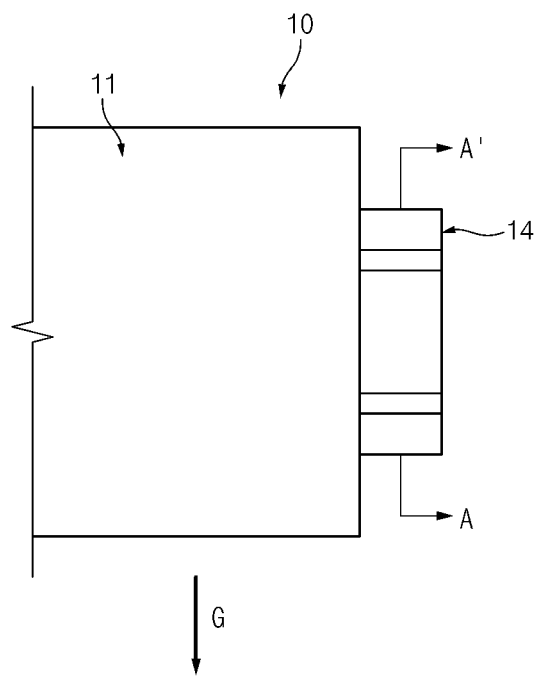
FIG. 7 is a plan view illustrating an example in which an uneven pattern is formed on an electrode tab through the pattern formation part in the apparatus for manufacturing the electrode for the secondary battery according to an embodiment of the present invention.
Figure 8:
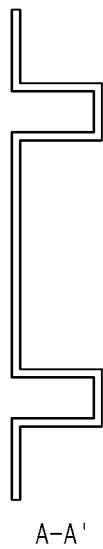
FIG. 8 is a cross-sectional view taken along line A-A' of FIG. 7.

FIG. 6 is a cross-sectional view illustrating an example of the pattern formation part in the apparatus for manufacturing the electrode for the secondary battery according to an embodiment of the present invention, FIG. 7 is a plan view illustrating an example in which the uneven pattern is formed on the electrode tab through the pattern formation part in the apparatus for manufacturing the electrode for the secondary battery according to an embodiment of the present invention, and FIG. 8 is a cross-sectional view taken along line A-A' of FIG. 7.

Referring to FIGS. 6 to 8, a pattern formation part P may form an uneven pattern on the electrode tab 14 when the electrode tab 14 is formed on the electrode sheet 10.

Also, the pattern formation part P may comprise a first pattern formation part 150 provided on the first notching roll 110 and a second pattern formation part 160 provided on the second notching roll 120.

The first pattern formation part 150 may be provided in plurality that are disposed at regular intervals along the outer circumferential surface of the first notching roll 110 and may be disposed between the plurality of convex portions 111 of the first notching cutter C11. Here, the first pattern formation part 150 may comprise a pattern protrusion 151 protruding in a direction of the second pattern formation part 160.

The second pattern formation part 160 may be provided in plurality that are disposed at regular intervals along the outer circumferential surface of the second notching roll 120 and may be disposed at a position corresponding to the first pattern formation part 150. Here, the second pattern formation part 160 may comprise a pattern groove 161 provided in a groove shape corresponding to the pattern protrusion 151.

The electrode tab 14 may be provided in a shape extending from the electrode sheet 10 in the width direction of the electrode sheet 10, and the uneven pattern may be formed in a shape parallel to the width direction of the electrode sheet 10. That is, the pattern protrusion 151 of the first pattern formation part 150 may form a protruding lane in parallel to the extending direction of the electrode tab 14 parallel to the width direction of the electrode sheet 10.

As a result, the uneven pattern may be formed parallel to the electrode tab 14 through the pattern formation part P to prevent the electrode tab 14 from being folded.

Also, the uneven pattern may be formed on the electrode tab 14 through the pattern formation part P to improve assembling properties through the uneven pattern provided between the electrode tabs 14 when the electrode sheet 10 is cut at regular intervals, and then the plurality of electrode sheets 10 are sequentially stacked. That is, since the electrode tabs 14 disposed on the plurality of stacked electrodes are stacked to face each other, when the uneven patterns formed on the electrode tabs 14 are stacked to correspond to each other, the uneven patterns may be coupled to each other or guide the electrode tabs to guide the stacking of the electrodes.

Referring to FIGS. 5 to 8, in the apparatus 100 for manufacturing the electrode for the secondary battery according to an embodiment of the present invention, the pattern formation part P may be provided with, for example, a plurality of square grooves in the electrode tab 14. Here, the pattern protrusion 151 of the first pattern formation part 150 may be provided, for example, in a square pillar shape.

Figure 9:
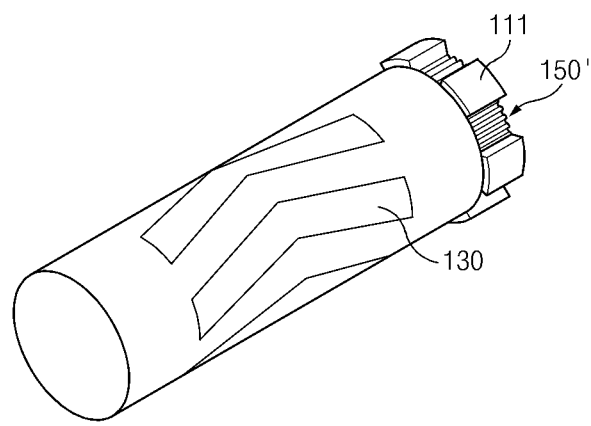
FIG. 9 is a perspective view illustrating another example of the first notching roll in the apparatus for manufacturing the electrode for the secondary battery according to an embodiment of the present invention.
Figure 10:
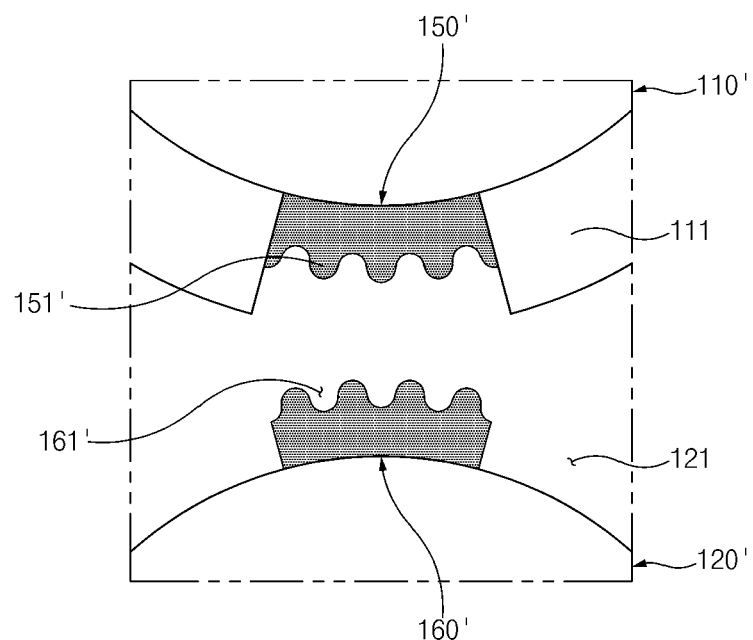
FIG. 10 is a cross-sectional view illustrating another example of the pattern formation part in the apparatus for manufacturing the electrode for the secondary battery according to an embodiment of the present invention.

FIG. 9 is a perspective view illustrating another example of the first notching roll in the apparatus for manufacturing the electrode for the secondary battery according to an embodiment of the present invention, and FIG. 10 is a cross-sectional view illustrating another example of the pattern formation part in the apparatus for manufacturing the electrode for the secondary battery according to an embodiment of the present invention.

Figure 11:
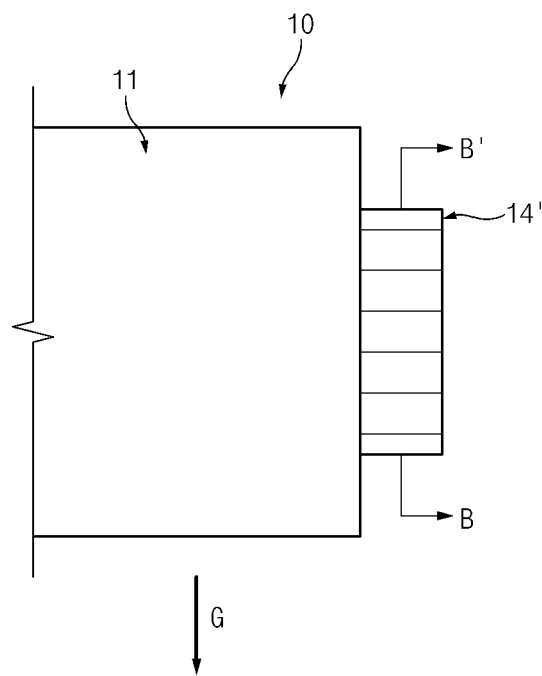
FIG. 11 is a plan view illustrating another example in which an uneven pattern is formed on an electrode tab through a pattern formation part in the apparatus for manufacturing the electrode for the secondary battery according to an embodiment of the present invention.
Figure 12:
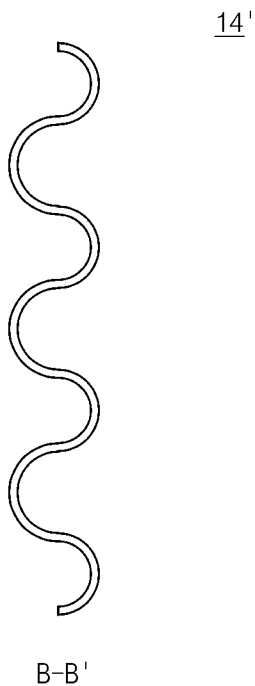
FIG. 12 is a cross-sectional view taken along line B-B' of FIG. 11.

FIG. 11 is a plan view illustrating another example in which an uneven pattern is formed on an electrode tab through a pattern formation part in the apparatus for manufacturing the electrode for the secondary battery according to an embodiment of the present invention, and FIG. 12 is a cross-sectional view taken along line B-B' of FIG. 11.

Referring to FIGS. 9 to 11, in the apparatus 100 for manufacturing the electrode for the secondary battery according to an embodiment of the present invention, a pattern formation part P' may be formed, for another example, a plurality of grooves in an electrode tab 14'. Here, a pattern protrusion 151' of a first pattern formation part 150' provided on a first notching roll 110' may be formed, for example, a plurality of protruding lanes, and a pattern groove 161' of a second pattern formation part 160' provided on a second notching roll 120' may be formed a plurality of groove-shaped lanes to correspond to the pattern protrusion 151'. Here, the electrode tab 14' may be provided in a shape in which a convex portion and a concave portion are repeated on a cross section when cut in a traveling direction G of the electrode sheet 10. Here, for example, the electrode tab 14' may be provided in a wave shape in cross section when cut in the traveling direction G of the electrode sheet 10.

Referring to FIG. 1, the supply roll U may supply the electrode sheet 10 in the direction of the notching roll R1.

The notched electrode sheet 10 passed through the notching roll R1 may be wound around the winding roll W.

That is, the electrode sheet 10 wound around the supply roll U may be released from the supply roll U and supplied to the notching roll R1 and then pass through the notching roll R1. The notched electrode sheet 10 may be wound around the winding roll W. Here, the traveling direction G of the electrode sheet 10 may be a direction in which the electrode sheet 10 is wound around the winding roll W from the supply roll U through the notching roll R1.

In the apparatus 100 for manufacturing the electrode for the secondary battery according to an embodiment of the present invention, which is configured as described above, when the electrode sheet 10 is notched, since the notching roll R1 rotates to form the electrode tab 14, stress may not be applied to tension of the electrode sheet 10 to prevent damage such as short circuit from occurring.

Also, in the apparatus 100 for manufacturing the electrode for the secondary battery according to an embodiment of the present invention, since the notch roll R1 rotates to notch the electrode sheet 10 so as to form the electrode tab 14, a notching speed may be adjustable, and thus, the notching speed may increase.

Furthermore, in the apparatus 100 for manufacturing the electrode for the secondary battery according to an embodiment of the present invention, since the notching roll R1 rotates to notch the electrode sheet 10, an axis around which the notch roll R1 rotates may be constant, and thus, a width in a direction of the electrode tab 14 may be constant, a mold may increase in lifespan, and noise may be reduced.

Hereinafter, an apparatus for manufacturing an electrode for a secondary battery according to another embodiment of the present invention will be described.

Figure 13:
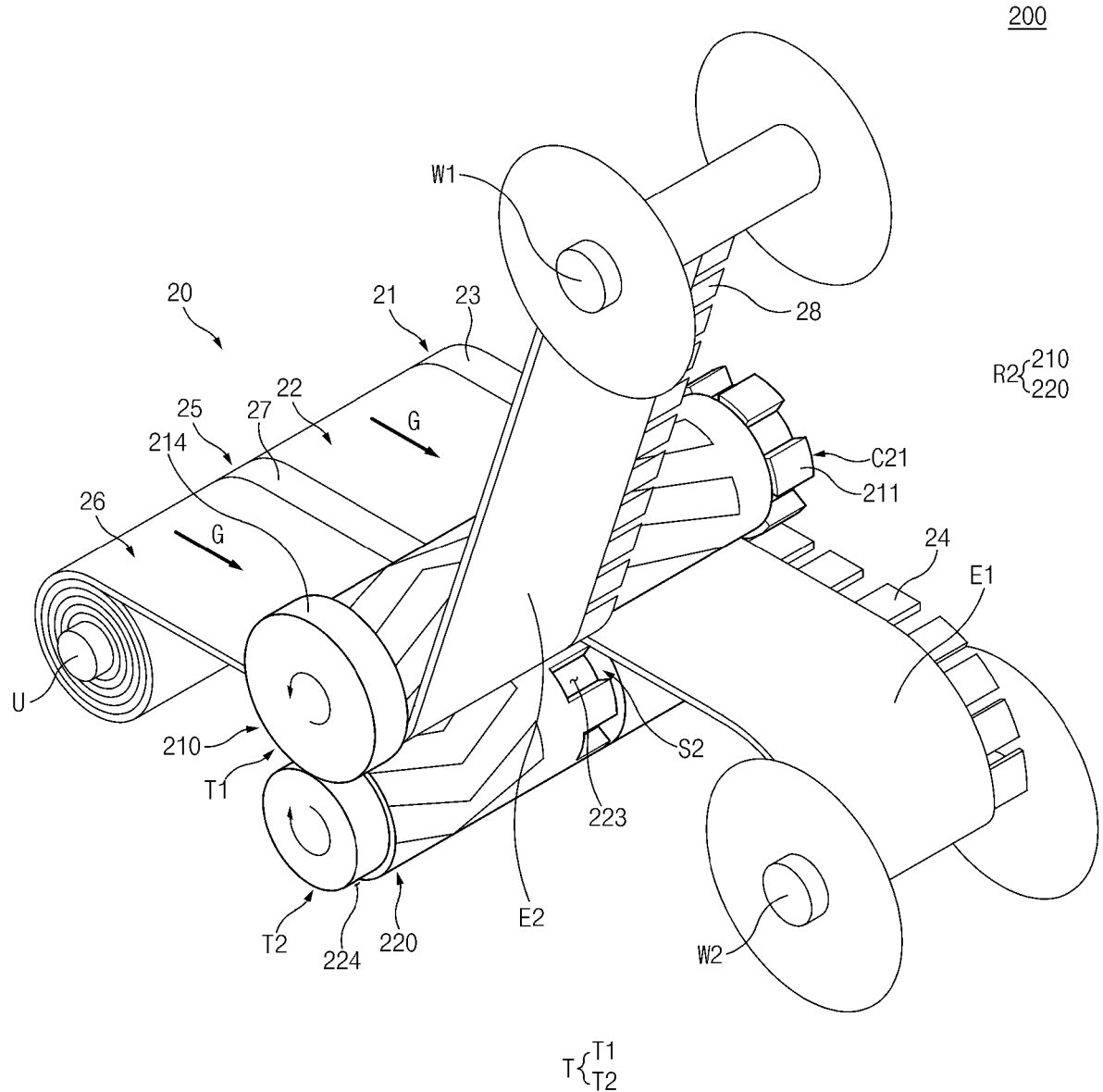
FIG. 13 is a conceptual perspective view of an apparatus for manufacturing an electrode for a secondary battery according to another embodiment of the present invention.
Figure 14:
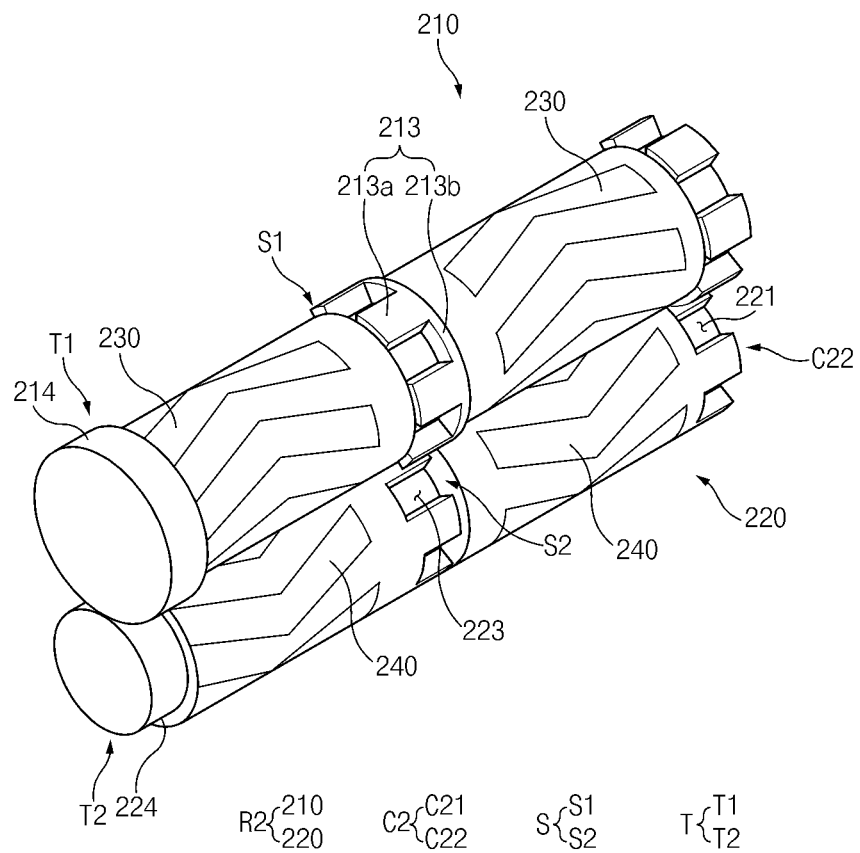
FIG. 14 is a perspective view of a notching roll in the apparatus for manufacturing the electrode for the secondary battery according to another embodiment of the present invention.
Figure 15:
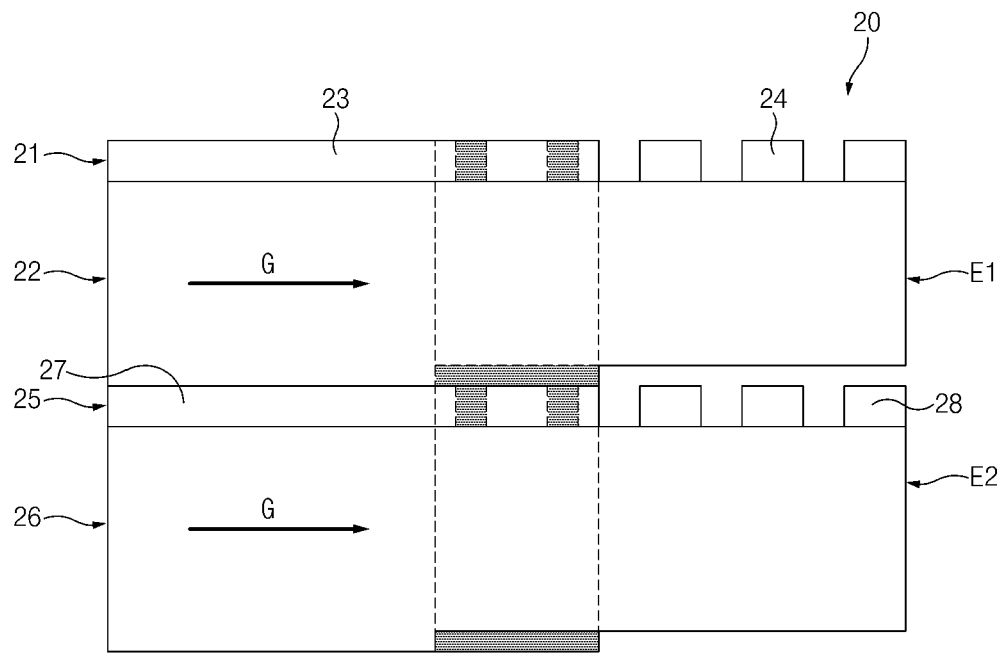
FIG. 15 is a plan view illustrating an example of an electrode sheet that is notched through the apparatus for manufacturing the electrode for the secondary battery according to another embodiment of the present invention.

FIG. 13 is a conceptual perspective view of an apparatus for manufacturing an electrode for a secondary battery according to another embodiment of the present invention, FIG. 14 is a perspective view of a notching roll in the apparatus for manufacturing the electrode for the secondary battery according to another embodiment of the present invention, and FIG. 15 is a plan view illustrating an example of an electrode sheet that is notched through the apparatus for manufacturing the electrode for the secondary battery according to another embodiment of the present invention.

Referring to FIGS. 13 to 15, an apparatus 200 for manufacturing an electrode for a secondary battery according to another embodiment of the present invention comprises a notching roll R2 that rotates to notch an electrode sheet 20 so as to form electrode tabs 24 and 28, a supply roll U supplying the electrode sheet 20, and winding rolls W1 and W2 around which the notched electrode sheet 20 is wound. The notching roll R2 comprises a notching cutter C2 notching the electrode sheet 20, roll pads 230 and 240 contacting the electrode sheet 20 to prevent the electrode sheet 20 from being slipped, a pattern formation part providing an uneven pattern on the electrode tabs 24 and 28, and a slitting cutter S separating the electrode sheet 20 into a plurality of sheets in a traveling direction G.

The apparatus 200 for manufacturing the electrode for the secondary battery according to another embodiment of the present invention is different from the apparatus for manufacturing the electrode for the secondary battery according to the foregoing embodiment of the present invention in that the apparatus 200 further comprises the slitting cutter S to separate the electrode sheet 20 into the plurality of sheets in the traveling direction G. Thus, contents of this embodiment, which are duplicated with those according to the forgoing embodiment, will be omitted or briefly described, and also, differences therebetween will be mainly described.

In more detail, the apparatus 200 for manufacturing the electrode for the secondary battery according to another embodiment of the present invention is an apparatus for manufacturing an electrode, in which portions of non-coating portions 23 and 27 of electrode collectors 21 and 25, on which electrode active materials 22 and 26 are not applied, in an electrode sheet 20 coated with the electrode active materials 22 and 26 on the electrode collectors 21 and 25 are notched to form electrode tabs 24 and 28.

The electrode sheet 20 applied to the electrode manufacturing apparatus 200 for the secondary battery according to another embodiment of the present invention is provided with the plurality of non-coating portions 23 and 27 to form lanes along the traveling direction G of the electrode sheet 20.

The notching roll R2 may notch the portions of the non-coating portions 23 and 27 of the electrode sheet 20 to form the electrode tabs 24 and 28. Here, the notching roll R2 may be provided in a pair and may comprise a first notching roll 210 and a second notching roll 220, which face both surfaces of the electrode sheet 20.

The notching roll R2 may comprise a notching cutter C2, roll pads 230 and 240, a pattern formation part, a cutting part T, and a slitting cutter S.

The notching cutter C2 may be provided on portions of the notching roll R2, which face the portions of the non-coating portions 23 and 27 of the electrode collectors 21 and 25, to notch the electrode sheet 20.

Also, the notching cutter C2 may comprise a first notching cutter C21 disposed on the first notching roll 210 and a second notching cutter C22 disposed on the second notching roll 220. Here, the first notching cutter C21 and the second notching cutter C22 may be disposed at mutually corresponding portions on the first notching roll 210 and the second notching roll 220, respectively.

The first notching cutter C21 may provide a protruding convex portion 211, and the second notching cutter C22 may provide a concave portion 221 provided in a groove shape.

Here, the convex portion 211 and the concave portion 221 are provided in shapes corresponding to each other to notch the electrode sheet 20 disposed between the convex portion 211 and the concave portion 221, thereby forming the electrode tab 24,28.

Here, the convex portion 211 on the first notching cutter C21 may protrude in a direction of the concave portion 221 of the second notching cutter C22 on an outer circumferential surface of the first notching roll 210.

Also, in the first notching cutter C21, the convex portion 211 may be provided in plurality, which are disposed at regular intervals along the outer circumferential surface of the first notching roll 210. In the second notching cutter C22, the concave portion 221 may be provided in plurality, which are disposed at regular intervals along the outer circumferential surface of the second notching roll 220.

The convex portion 211 of the first notching cutter C21 may be provided in a square pillar shape. Here, the concave portion 221 of the second notching cutter C22 may be provided to correspond to the convex portion 211 having the square pillar shape of the first notching cutter C21.

The slitting cutter S may cut and notch ends of the plurality of non-coating portions 23 and 27 to separate the electrode sheet 20 into a plurality of sheets in the traveling direction G.

Also, the slitting cutter S may comprise a first slitting cutter S1 disposed on the first notching roll 210 and a second slitting cutter S2 disposed on the second notching roll 220.

Here, the first slitting cutter S1 and the second slitting cutter S2 may be disposed at mutually corresponding portions on the first notching roll 210 and the second notching roll 220, respectively.

The first slitting cutter S1 may provide a protruding slitting projection 213, and the second slitting cutter S2 may provide a slitting recess 223 provided in a groove shape.

The slitting projection 213 and the slitting recess 223 are provided in shapes that mutually correspond to each other so that a portion of the electrode sheet 20 disposed between the slitting projection 213 and the slitting recess 223 is cut and notched.

Here, the slitting projection 213 may protrude in a direction of the slitting recess 223 of the second notching cutter C22 on an outer circumferential surface of the first notching roll 210.

The electrode sheet 20 may be cut by the slitting cutter S so as to be divided into one electrode sheet E1 and the other electrode sheet E2 in a width direction. Here, the notching cutter C2 may form an electrode tab 24 on the one electrode sheet E1.

The slitting projection 213 may comprise a notching protrusion 213a disposed at one side to form the electrode tab 28 on the other electrode sheet E2 and a slitting protrusion 213b disposed at the other side to cut a portion between the one side and the other side of the electrode sheet 20.

The notching protrusion 213a may be provided in plurality, which are at regular intervals along the outer circumferential surface of the first notching roll 210, and the slitting protrusion 213b may continuously extend along the outer circumferential surface of the first notching roll 210.

When the electrode sheet 20 is cut by the slitting cutter S and is divided into one electrode sheet E1 and the other electrode sheet E2 in the width direction, the cutting part T may cut an end of the other electrode sheet E2 to adjust a width of the other electrode sheet E2.

Also, the cutting part T may comprise a first cutting part T1 provided on the first notching roll 210 and a second cutting part T2 provided on the second notching roll 220. Here, the first cutting part T1 and the second cutting part T2 may be disposed at mutually corresponding portions on the first notching roll 210 and the second notching roll 220, respectively.

The first cutting part T1 may provide a protruding cutting protrusion 214, and the second cutting part T2 may provide a cutting groove 224 provided in a groove shape.

Here, the cutting protrusion 214 and the cutting groove 224 are provided in shapes corresponding to each other to notch the end of the electrode sheet 20 disposed between the cutting protrusion 214 and the cutting groove 224, thereby adjusting the width of the other electrode sheet E2.

Here, in the first cutting part T1, the cutting protrusion 214 may protrude from an outer circumferential surface of the first notching roll 210 in a direction of the cutting groove 224 of the second cutting part T2.

The roll pads 230 and 240 are provided on portions of the notching roll R2, which face the electrode active material 22 and 26. When the notching roll R2 rotates, the roll pads 230 and 240 may contact the electrode sheet 20 to prevent the electrode sheet 20 from being slipped.

Also, the roll pads 230 and 240 may be provided with a plurality of patterns that are disposed at regular intervals along the outer circumferential surface of the notching roll R2. Here, the roll pads 230 and 240 may be provided to be arranged in a plurality of rows on the outer circumferential surface of the notching roll R2 so that the roll pads 230 and 240 contact the one electrode sheet E1 and the other electrode sheet E2, respectively, when the electrode sheet 20 is divided through the slitting cutter S.

The patterns may be provided in a shape that a central portion protrudes in a traveling direction G of the electrode sheet 20. Here, the patterns may be provided, for example, in the form of an arrow or a triangle.

Also, the roll pads 230 and 240 may be provided on the outer circumferential surfaces of the first notching roll 210 and the second notching roll 220 in the notching roll R2, respectively. Here, the roll pad 230 provided on the first notching roll 210 and the roll pad 240 provided on the second notching roll 220 may be disposed in shapes corresponding to each other.

Referring to FIG. 13, the supply roll U may supply the electrode sheet 20 in the direction of the notching roll R2.

The notched electrode sheet 20 passed through the notching roll R2 may be wound around the winding rolls W1 and W2.

That is, the electrode sheet 20 wound around the supply roll U may be released from the supply roll U and supplied to the notching roll R2 and then pass through the notching roll R2. The notched electrode sheet 20 may be wound around the winding rolls W1 and W2. Here, the traveling direction G of the electrode sheet 20 may be a direction in which the electrode sheet 20 is wound around the winding rolls W1 and W2 from the supply roll U through the notching roll R2.

Also, the winding rolls W1 and W2 are respectively disposed at one side and the other side. When the electrode sheet 20 is divided through the slitting cutter S, the one electrode sheet E1 may be wound around the winding roll W1 disposed at the one side of the one electrode sheet E1, and the other electrode sheet E2 may be wound around the winding roll W2 disposed at the other side.

Here, for example, the winding roll W1 disposed at the one side may be disposed at a lower side or disposed at a side parallel to the traveling direction, and the winding roll W2 disposed at the other side may be disposed at an upper side.

Thus, since a gap between a lane of the one electrode sheet E1 and a lane of the other electrode sheet E2 is very narrow, the electrode sheets E1 and E2 may be wound while being prevented from interfering therebetween.

While the present invention has been particularly shown and described with reference to exemplary embodiments thereof, it is to be understood that the scope of the present invention is not limited to the apparatus for manufacturing the electrode for the secondary battery according to the present invention. It will be understood by those of ordinary skill in the art that various changes in form and details may be made therein without departing from the spirit and scope of the present invention.

Furthermore, the scope of protection of the present invention will be clarified by the appended claims.

The invention claimed is:

1. An apparatus for manufacturing an electrode for a secondary battery, the apparatus comprising:
   a notching roll that rotates to notch an electrode sheet to form an electrode tab, the electrode sheet including a coated portion that is coated with an electrode active material and an electrode collector that is a non-coating portion that is not coated with the electrode active material, the electrode tab being formed in the electrode collector,
   wherein the notching roll comprises:
   a notching cutter provided on a portion of the notching roll, which faces the non-coating portion of the electrode collector, to notch the electrode sheet at the electrode collector; and
   a roll pad provided on a different portion of the notching roll, which faces the electrode active material, the roll pad contacting the electrode sheet when the notching roll rotates to prevent the electrode sheet from being slipped,
   wherein the notching roll comprises a first notching roll and a second notching roll, which face opposite surfaces of the electrode sheet,
   wherein the notching cutter comprises a first notching cutter provided on the first notching roll and a second notching cutter provided on the second notching roll,
   wherein the first notching cutter is provided with a convex portion that is protruding, and the second notching cutter is provided with a concave portion that is provided in a groove shape, and
   wherein the convex portion of the first notching cutter is located at an end edge in a longitudinal direction of the first notching roll.

2. The apparatus of claim 1,
   wherein the first notching cutter and the second notching cutter are disposed at mutually corresponding portions on the first notching roll and the second notching roll.

3. The apparatus of claim 2,
   wherein the convex portion and the concave portion are provided in shapes that correspond to each other so that the electrode sheet disposed between the convex portion and the concave portion is notched to form the electrode tab.

4. The apparatus of claim 3, wherein, in the first notching cutter, the convex portion protrudes from the outer circumferential surface of the first notching roll in a direction of the concave portion of the second notching cutter when the convex portion and the concave portions are at the mutually corresponding portions.

5. The apparatus of claim 4, wherein, in the first notching cutter, the convex portion is provided in a plurality, which are disposed at regular intervals along the outer circumferential surface of the first notching roll, and
   wherein, in the second notching cutter, the concave portion is provided in a plurality, which are disposed at regular intervals along an outer circumferential surface of the second notching roll.

6. The apparatus of claim 5, wherein the convex portion of the first notching cutter has a square pillar shape.

7. The apparatus of claim 5, wherein the notching roll further comprises a pattern formation part configured to provide an uneven pattern on the electrode tab when the electrode tab is formed on the electrode sheet.

8. The apparatus of claim 7, wherein the pattern formation part comprises a first pattern formation part disposed on the first notching roll and a second pattern formation part disposed on the second notching roll,
   wherein the first pattern formation part is provided in a plurality, which are disposed at regular intervals along the outer circumferential surface of the first notching roll, wherein the first pattern formation parts are disposed between the plurality of convex portions of the first notching cutter, and
   wherein the second pattern formation part is provided in a plurality, which are disposed at regular intervals along the outer circumferential surface of the second notching roll, wherein the second pattern formation parts are disposed at a position corresponding to the first pattern formation parts.

9. The apparatus of claim 8, wherein the first pattern formation parts comprise a pattern protrusion protruding in a direction of the second pattern formation parts, and
   wherein the second pattern formation parts comprise a pattern groove having a groove shape corresponding to that of the pattern protrusion.

10. The apparatus of claim 1, wherein the roll pad is provided with a plurality of patterns, which are disposed at regular intervals along the outer circumferential surface of the first notching roll and an outer circumferential surface of the second notching roll, and
    wherein each of the plurality of patterns has a central portion in a traveling direction of the electrode sheet.

11. The apparatus of claim 1, wherein, in the electrode sheet, the non-coating portion is provided in a plurality to form lanes in a traveling direction of the electrode sheet, and
    wherein the notching roll further comprises a slitting cutter configured to cut and notch ends of the plurality of non-coating portions so that the electrode sheet is divided into a plurality of sheets in the traveling direction of the electrode sheet.

12. The apparatus of claim 11, wherein the notching roll comprises a first notching roll and a second notching roll, which face opposite surfaces of the electrode sheet,
    wherein the slitting cutter comprises a first slitting cutter provided on the first notching roll and a second slitting cutter provided on the second notching roll, and
    wherein the first slitting cutter and the second slitting cutter are disposed at mutually corresponding portions on the first notching roll and the second notching roll.

13. The apparatus of claim 12, wherein the first slitting cutter is provided with a slitting projection that is protruding, and the second slitting cutter is provided with a slitting recess having a groove shape, wherein the slitting projection and the slitting recess have shapes corresponding to each other to cut and notch a portion of the electrode sheet disposed between the slitting projection and the slitting recess, and wherein the slitting projection protrudes from the outer circumferential surface of the first notching roll in a direction of the slitting recess of the second notching cutter.

14. The apparatus of claim 13, wherein the electrode sheet is cut by the slitting cutter so as to be divided into a first electrode sheet and a second electrode sheet in a width direction, wherein the notching cutter is configured to form the electrode tab on the first electrode sheet, wherein the slitting projection comprises a notching protrusion disposed at a first side to form the electrode tab on the second electrode sheet and a slitting protrusion disposed at a second side to cut a portion between the first side and the second side of the second electrode sheet, and wherein the notching protrusion is provided in a plurality, which are disposed at regular intervals along the outer circumferential surface of the first notching roll, and the slitting protrusion continuously extends along the outer circumferential surface of the first notching roll.

15. The apparatus of claim 14, further comprising:
a supply roll configured to supply the electrode sheet in a direction of the notching roll; and
a winding roll around which the notched electrode sheet passed through the notching roll is wound.

16. An electrode for a secondary battery, which is manufactured through the apparatus for manufacturing the electrode for the secondary battery of claim 1.

17. A secondary battery comprising the electrode for the secondary battery, which is manufactured through the apparatus for manufacturing the electrode for the secondary battery of claim 1.

18. The apparatus of claim 1, wherein an outer circumferential surface of the convex portion is located farther from an axis of the first notching roll in a radial direction than an outer circumferential surface of the first notching roll.

19. The apparatus of claim 1, wherein the concave portion of the second notching cutter is located at an end edge in a longitudinal direction of the second notching roll.

* * * * *